United States Patent [19]
Wing

[11] 3,718,130
[45] Feb. 27, 1973

[54] FREE CORE GRINDING DRILL

[76] Inventor: Frederick Donald Wing, 145 Beacon Lane, Jupiter Inlet Colony, Jupiter, Fla. 33458

[22] Filed: Dec. 28, 1970

[21] Appl. No.: 101,507

[52] U.S. Cl. .................................... 125/20, 175/398
[51] Int. Cl. .............................................. B28d 1/14
[58] Field of Search ........ 175/398, 399, 400; 125/20; 51/209

[56] References Cited

UNITED STATES PATENTS

| | | | |
|---|---|---|---|
| 3,169,415 | 2/1965 | Welty | 125/20 X |
| 3,243,924 | 4/1966 | Peters | 125/20 |
| 2,425,132 | 8/1947 | Stoken | 175/400 X |
| 3,077,936 | 2/1963 | Arutunoff | 175/107 X |
| 3,153,885 | 10/1964 | Keller | 125/20 X |
| 3,033,298 | 5/1962 | Johnson | 124/20 UX |
| 3,494,348 | 2/1970 | Lindblad | 125/20 |

FOREIGN PATENTS OR APPLICATIONS 119,771   4/1901   Germany.............................175/400

*Primary Examiner*—Harold D. Whitehead
*Attorney*—Meyer A. Baskin

[57] ABSTRACT

A core drill designed to insure a core will be generated sufficiently smaller in diameter than the normal inside diameter of the drill, and therefore a free or loose core, to assure easy removal or drop out of the core from the drill. This is accomplished by providing a drill of any predetermined outer diameter and an inner bore providing a smaller inner diameter having longitudinal walls parallel with but offset relative to the longitudinal walls of the outer diameter, therefore, in operation, the running inside diameter rotates eccentrically to the true running outside diameter on a common axis to generate a core having a smaller diameter than the inside diameter of the core drill.

4 Claims, 6 Drawing Figures

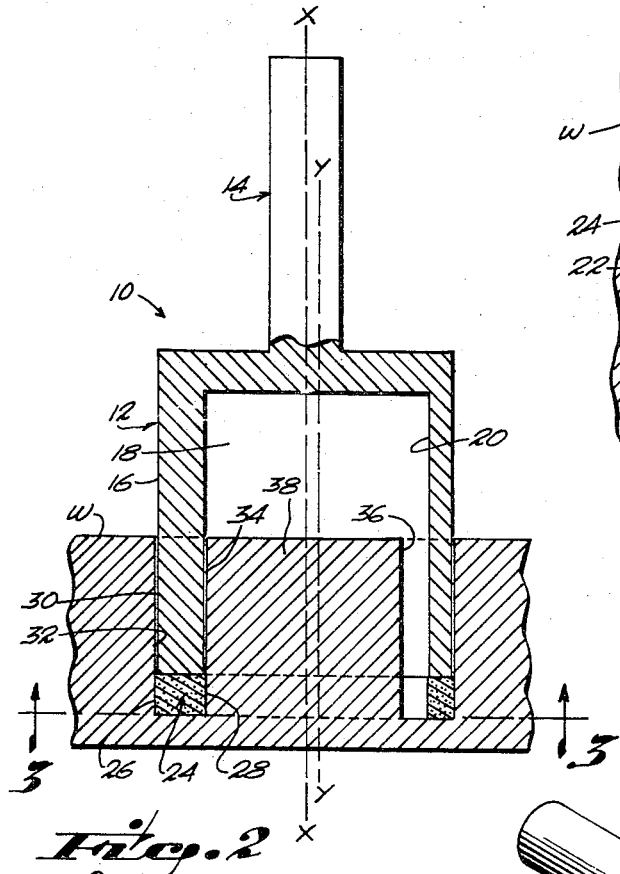
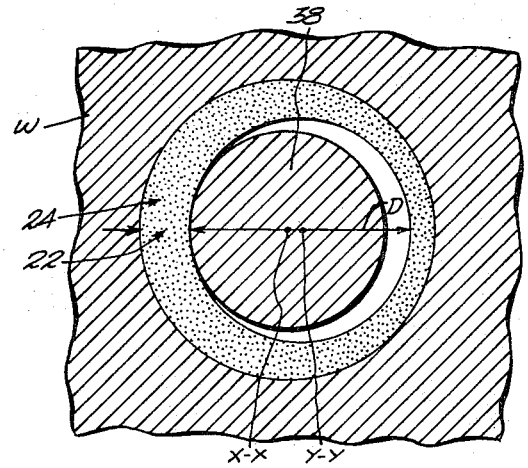
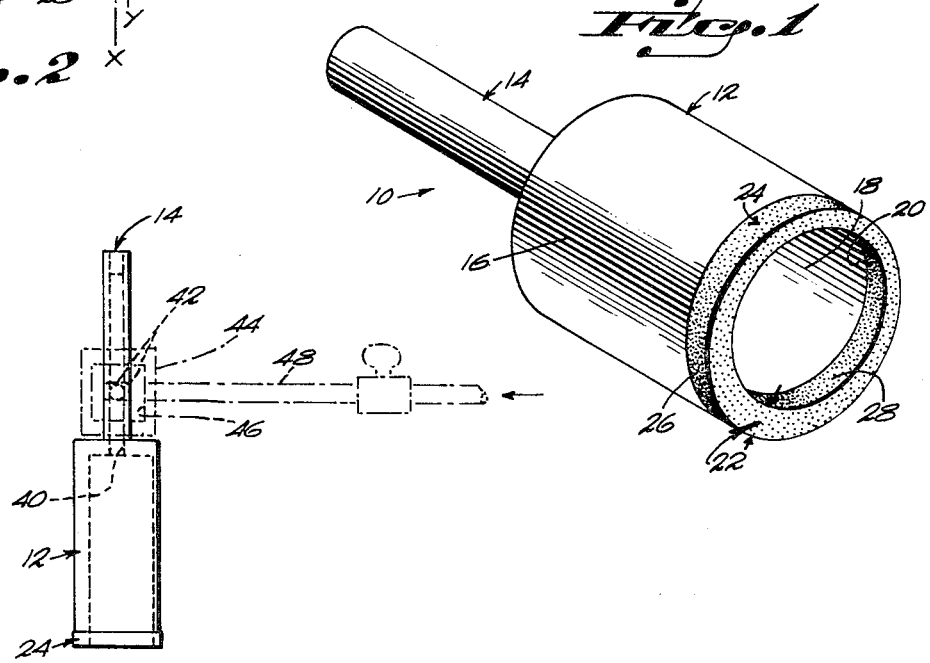
INVENTOR.
FREDERICK DONALD WING

FREE CORE GRINDING DRILL

This invention relates to a type of drill commonly referred to as a trepanning tool or core drill which will hereinafter be referred to as a core drill.

In the present art, one of the major technical problems has been in the removal of the core after the core drilling operation was completed. The core being of the same outside diameter as the inside diameter of the core drill, together with sludge from the ground material itself, combine to hold the core in the core drill and make its removal difficult and time consuming.

A liquid coolant is usually used with an abrasive core drill by introducing the coolant in to or onto the core drill and the material being worked. Since the core fills the inside diameter of the core drill, and the outside diameter of the core drill fits the hole being drilled, very little of the coolant reaches the annular surface being abraded on the material, after the core drill has penetrated a relatively short depth. Excessive friction heat is generated as the core drill penetrates further into the work and therefore, less coolant can reach the surface being abraded. The speed of rotation of the core drill must then be reduced in order to reduce the friction heat being generated resulting in slowing down the operation and consuming more time.

In the present art also, frequently the core has become more or less wedged inside of the core drill. This core then exerts pressure on the bottom of the material being drilled, and in combination with the friction heat being generated, can and does cause the cored area to break out irregularly at the other side or end of the material being drilled, before the core drill has completed the hole. This frequently happens on more fragile or brittle material which is very often also the most expensive materials such as glass, fused quartz, fused silica, silicon, germanium, porcelain, ceramics, and many other materials.

There is a strong need, therefore, for an abrasive type core drill that will overcome the foregoing difficulties and shortcomings.

It is an object of the invention to provide an abrading core drill that generates a smaller core than the inside diameter of the core drill itself, resulting in a core that will drop out after a core drilling operation, or be, easily removed by providing such a drill in which the inner diameter is eccentric relative to the outside diameter thereto.

Yet another object of the present invention is to provide a drill having a cutting edge of the type utilizing a grinding action as provided by a diamond, silicon carbide, or other abrasive material impregnated cutting edge, said edge having an inner diameter eccentric to its outer diameter in general conformity with the inner and outer diameters of the main body portion of the drill. While the eccentric inner diameter may have other contours it is preferably circular.

Still another object of this invention is to provide a drill of the aforementioned type which may be provided with various conventional types of liquid cooling means preferably of the type which feeds coolant through the shank of the drill under pressure downwardly through the body portions thereof to the grinding edge as it rotates in contact with the work.

Yet another object of this invention is to provide a drill which will grind a wide variety of materials such as hard metals, vitreous and ceramic materials, glass, tile, porcelain, cement, pavements, marble, granite and other rock type materials, for example.

Another object of this invention is to provide a drill which may be mounted in a portable hand drill and not be limited to mounting in a machine tool such as a milling machine, boring mill, or drill press.

It is a further object of this invention to allow the coolant freer access to the annular surface being abraded, therefore reducing the friction heat being generated. The freer coolant flow, in addition to carrying away the friction heat being generated, also aids in carrying away the residue or sludge of the material being core drilled.

Still another object of the invention is to reduce the pressure the snug fitting core would have on the opposite end of the material being worked, and many times causing an irregular break out, before the core drilling operation is actually complete.

With the above objectives in view, as will be presently apparent, the invention consists in general of certain novel construction and geometry hereinafter fully described, illustrated in the accompanying drawings and particularly claimed.

Whereas the drawings show a type of abrading core drill with a bonded diamond or abrasive annular end or edge. This invention includes core drills that may be solid abrasives all the way up the main body of the tool or may be plain metal or other materials to be used with loose abrasives or abrasive slurries.

DESCRIPTION OF THE PRIOR ART

U.S. Pat. No. 1,187,618 issued to G. O. Gridley shows a drill restricted to "for cutting an annular groove." This drill employs an eccentric relationship between the inner and outer diameters thereof, however, the inner eccentric bore is helical instead of straight through which would be very difficult to produce and make it impossible to core drill through any material of any significant thickness. In addition, the cutting edge employs a single cutting point or tooth instead of providing a grinding surface about its lower annular face. The tool of this patent is clamped or held stationary and the work is rotated. It is therefore not portable to the material and it could not be used, for example, to mount in a hand drill and bore a hole in a large immovable concrete structure or road bed, some distance away.

U.S. Pat. No. 2,444,099 issued to S. W. Hennessey, Jr., illustrates a "hole cutting saw" with up to "20 teeth" which are difficult to sharpen without affecting the diameter of the drilled holes. This patent is dependent on wide area cutting saw teeth to eliminate troubles caused by smaller saw teeth, making it necessary to remove more material to achieve the desired result. The lower end of the spindle forms a pilot which is received within a central opening which has been previously drilled or punched into the material.

U.S. Pat. No. 2,947,206 issued to H. J. Flanagan shows a trepanning drill which is not new in itself and provides no eccentric inside diameter to effect a free core and U.S. Pat. No. 3,227,103 issued to L. Zimmerman is also a toothed cutting tool, providing a Pair of cutting elements one tooth cuts the outside diameter and the other cuts the inside diameter.

DESCRIPTION OF THE DRAWING

FIG. 1, is an isometric view of the core drill of the present invention;

FIG. 2, illustrates a side elevational view of the core drill of the present invention performing a drilling operation, parts being broken away to better illustrate the invention;

FIG. 3, is a cross sectional view taken on line 3—3 of FIG. 2, looking in the direction of the arrows;

FIG. 6, schematically illustrates one application of providing a coolant to the core drill during the drilling operation.

Figure 4:
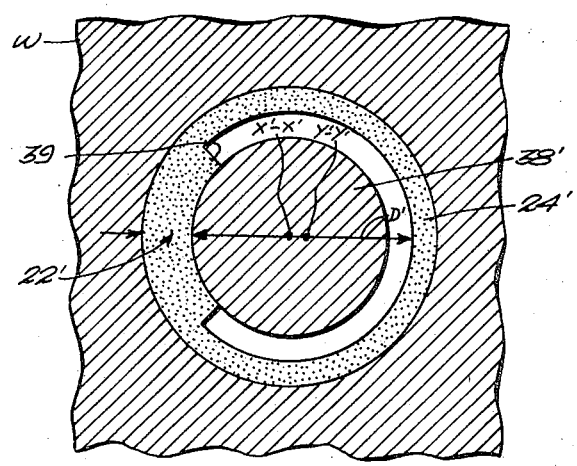
FIG. 4, is a view like FIG. 3 showing a modification.

In the drawings in which like reference numerals designate like or similar parts throughout the several views of the drawings, the numeral 10 generally indicates the core drill of the present invention which includes a main body portion indicated generally at 12, and a shank portion 14 provided for engagement in the chuck a conventional type of fixed machine tool or portable hand drill.

The core drill of the present invention is shaped generally like a pipe and is provided with a diamond or silicon carbide or other abrasive material impregnated cutting edges. At the present time with the tools in general use, the core, or plug generated by drilling through the work material too often becomes wedged inside the tool thus creating a removal problem and in some cases, the pressure caused by this wedging can cause a fracture breakthrough of the material being drilled which results in rejection of or damage to the part being drilled.

To obviate this objectional feature of many of the tools of this type now in use, the main body or working portion 12 of the tool of the present invention provides an outer diameter 16 and an inner bore or cavity 18 which provides an inner diameter 20 which is eccentric relative to the outer diameter 16.

As best illustrated in FIG. 2, the broken line $x-x$ illustrates the common rotating axis of the shank and outer working diameter 16 of the tool 10. And the broken line $y-y$ shows the axis of the inner bore 18 which is parallel to and offset relative to the axis of rotation $x-x$ whereby the inner diameter 20 rotates eccentrically relative to outer diameter 16 on the common axis $x-x$.

A diamond, silicon carbide or other abrasive impregnated grinding end section 24 is provided on the tool which is bonded or plated to the lower end of the main body portion 12. The entire section 24 will be used as said section wears down. The cutting end section 24 provides outer and inner diameters 26 and 28 in an eccentric relationship conforming to the eccentric relationship of the outer and inner diameter 16 and 20 of the main body portion 12 of the tool 10. The outer diameter 26 may be slightly larger than the outer diameter 16 of the main body portion 12 and the inner diameter 28 may be slightly less than the inner diameter of the inner diameter 20 of the main body portion to provide a relief 30 between the outer diameter 16 of the main body portion 12 and the outer diameter 32 of the hole being drilled in the work W. In like manner a relief 34 is provided between the inner diameter 20 of the main body portion 12 and the outer diameter 36 of the core 38 being generated by the drilling operation in the work W.

As best illustrated in FIG. 3, a free core 38 is generated by the tool 10 of the present invention due to the eccentric relationship between the outer and inner diameter 26 and 28 of the grinding end 24. The thickest point 22 in the wall of the grinding end section 24 rotates in the same arc as the resulting core.

FIG. 6, schematically illustrates one form of providing a coolant to the cutting end of the tool during the drilling operation. A bore 40 is provided axially of the shank portion 14 and into the main body portion 12 of the drill, communicating with the inner diameter 20 and the grinding end 24, and one or more diametrically disposed bores 42 are provided in communication with said bore 40. A housing 44 is sealingly circumposed about the outer circumference 14 of the shank portion 14 of the drill and provides an inner annular chamber 46 in direct communication between the axial bore 40, by means of the diametric bores 42, and a coolant feed line 48 from a feed source (not shown). The coolant is preferably fed to the cutting edge 24 under pressure. Other forms or methods of providing a coolant to the cutting or grinding edge through the axial bore may be employed. In some instances the core drill may also be used without coolant.

Figure 5:
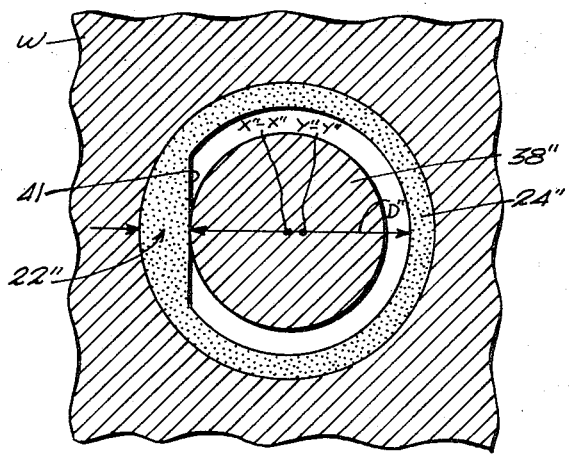
FIG. 5, is a view like FIG. 3 showing still another modification.

The modifications shown in FIGS. 4 and 5 shows an inward protrusion which would have the same effects and results as the preferred continuous circular eccentric bore as shown in FIG. 3. In the modification shown in FIG. 4 the inward protrusion 39 on the inside diameter D' is shown as 90° of the arc of the inside circle. While this proportion is shown for clarity, the protrusion could be of any arc length from a bare minimum up to 180° of arc.

In the modification shown in FIG. 5 there is shown a flat section 41 along the otherwise circular inside diameter.

With reference to FIGS. 3, 4, and 5 it is clearly apparent that the three forms illustrated are provided with respective grinding ends 24, 24' and 24'' providing corresponding thick points 22, 22' and 22'' whereby corresponding cores 38, 38' and 38'' are generated. The respective forms illustrated in FIGS. 3, 4, and 5 provide similar diameters D, D' and D'' between said thick points 22, 22' and 22'' and their respective opposed side wall portions as well as similar respective locations of the axes of rotation $x-x$, $x'-x'$ and $x''-x''$, and bore axes $y-y$, $y'-y'$ and $y''-y''$. Therefore, each of said forms provides a bore having at least one portion which rotates eccentrically about their respective axes of rotation $x-x$, $x'-x'$ and $x''-x$'' relative to their respective diametrically opposed side wall portions.

While a preferred form of the invention has been illustrated and described, it will be obvious to those skilled in the art that various modifications and substitutions can be made without departing from the scope of the invention as defined in the appended claims.

What is claimed is:

1. A Core Drill Comprising:
   A. A shank portion adapted for rotative engagement in the chuck of a drilling or rotative apparatus;
   B. A cylindrical working body portion having, 1. an outer diameter the axis of rotation of which is common to the axis of rotation of said shank portion,
2. an inner bore extending a predetermined distance upwardly into said main body portion, said inner bore having,
   a. the major portion of its cylindrical wall extending substantially coaxially with the axis of rotation of said main body portion, and
   b. minor portion of its cylindrical wall having a diameter slightly less than the diameter of said major portion of said wall and extending substantially on an axis displaced from and parallel to the axis of rotation of the main body portion on which the major portion of said cylindrical wall rotates whereby the minor portion of the cylindrical wall of said inner bore rotates eccentrically to the major portion of said cylindrical wall,
3. an operative grinding end;

C. A grinding means at said operative grinding end extending 360° thereabouts whereby the grinding operation is performed substantially and simultaneously around the entire 360° of said grinding end.

2. A core drill for optical quality material as defined in claim 1 including a central bore extending axially through the shank and into the said working, body portion whereby a liquid coolant may be supplied to said grinding end during the drilling operation.

3. A core drill as defined in claim 2, in which the outer diameter of said grinding means is slightly larger than the outer diameter of said body portion and the inner diameter of said grinding means is slightly smaller than the inner diameter of said eccentric bore.

4. A core drill is defined in claim 1 in which said eccentric minor portion comprises an inward protrusion on said inside diameter of said bore.

* * * * *